UNITED STATES PATENT OFFICE.

WILLIAM H. ROSS AND ALBERT R. MERZ, OF WASHINGTON, DISTRICT OF COLUMBIA.

PROCESS FOR PREPARING CONCENTRATED FERTILIZER.

1,191,615. Specification of Letters Patent. Patented July 18, 1916.

No Drawing. Application filed April 11, 1916. Serial No. 90,487.

(DEDICATED TO THE PUBLIC.)

*To all whom it may concern:*

Be it known that we, WILLIAM H. Ross and ALBERT R. MERZ, citizens of the United States of America, and employees of the Department of Agriculture of the said United States, residing at Washington, District of Columbia, (whose post-office address is Washington, District of Columbia,) have invented a new and useful Process for Preparing Concentrated Fertilizer.

This application is made under the act of March 3, 1883, Chapter 143 (22 Stat., 625), and the invention herein described and claimed may be used by the Government of the United States or any of its officers or employees in the prosecution of work for the Government, or any person in the United States, without payment to us of any royalty thereon.

Our invention relates to a process for preparing a concentrated fertilizer consisting of ammonium and potassium phosphate, which by reason of its concentrated form will admit of being shipped to places remote from where the product is prepared.

Apart from the potash silicates the commercial utilization of which as a source of potash is problematic, the only known deposits of potash in this country occur in the far west, the largest phosphate deposits in this country likewise occur in the west. Up to the present, however, no extensive utilization has been made of these deposits owing to the high cost involved in transporting these materials to the regions where they could be used.

In the process herein described a method is outlined whereby raw materials containing potash, phosphoric acid and ammonia may be treated in such a way that there is produced a material containing the three fertilizing elements, potassium, phosphorus and nitrogen in concentrated form whereby the cost of transportation is reduced to a minimum.

In carrying out the process there are used as raw materials ignited alunite or such compounds as potassium sulfate or potassium carbonate prepared from any source or any substance containing potassium sulfate or potassium carbonate, phosphate rock, and ammonia prepared by fixing atmospheric nitrogen or from any other source, as coal. The phosphate rock is first treated by one of the well-known methods commercially utilized in extracting phosphoric acid from phosphate rock; thus, it may be treated with sulfuric acid, of which large quantities are allowed annually to go to waste in western sulfid smelters; or the method may be used of volatilizing in an electric furnace the phosphorus from the phosphate rock, following which provision is made for its immediate oxidation into phosphoric acid.

A quantity representing 10 molecules of the phosphoric acid prepared in the way described is added to a molecular equivalent of fresh phosphate rock. By this treatment the phosphate rock is changed into calcium mono-phosphate with an excess of phosphoric acid present equivalent, when 10 molecules of the acid are taken, to the phosphoric acid combined in the mono-phosphate. We then add a quantity of potassium sulfate from alunite or other source equivalent to the calcium in the calcium mono-phosphate. The reactions which take place are represented by the following equations:

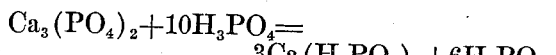
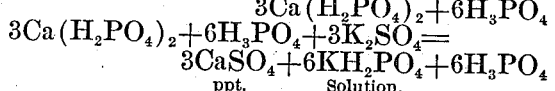
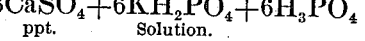

$$Ca_3(PO_4)_2 + 10H_3PO_4 = 3Ca(H_2PO_4)_2 + 6H_3PO_4$$
$$3Ca(H_2PO_4)_2 + 6H_3PO_4 + 3K_2SO_4 = \underset{\text{ppt.}}{3CaSO_4} + \underset{\text{Solution.}}{6KH_2PO_4 + 6H_3PO_4}$$

The reacting agents are brought into intimate mixture by thorough stirring and the precipitated calcium sulfate is then filtered off. The presence of the phosphoric acid has the effect of increasing the solubility of the potassium mono-phosphate with the result that a very concentrated filtrate may be obtained if desired without any danger of the potassium mono-phosphate being precipitated from solution. If now ammonia gas be passed into this solution until it gives a neutral reaction to cochineal, there will be formed ammonium mono-phosphate due to the combination of the ammonia with the free phosphoric acid in solution, and when the proper concentration of solution is used the entire reacting mass on cooling will be completely converted into a solid consisting only of postassium and ammonium phosphate and hydroscopic moisture. The heat of the reaction generated by the combination of ammonia with the phosphoric acid will automatically cause a volatilization of a portion of the water in solution.

It is not to be understood that the product obtained must necessarily be represented by the formula $KH_2PO_4+NH_4H_2PO_4$. By varying the proportion of phosphoric acid in excess of that necessary to convert the phosphate rock into calcium mono-phosphate there may be obtained a final product containing $KH_2PO_4$ and $NH_4H_2PO_4$ in any proportion between rather wide limits. This fact enables the process to be varied somewhat according to the relative availability of the raw materials used.

When the source of the potash used in this process consists of potassium carbonate instead of the sulfate, the process needs to be modified to the extent that the excess of phosphoric acid above that necessary to convert the phosphate rock into calcium monophosphate is not added until after the precipitated calcium carbonate is removed. The reactions in this case will be represented as follows:

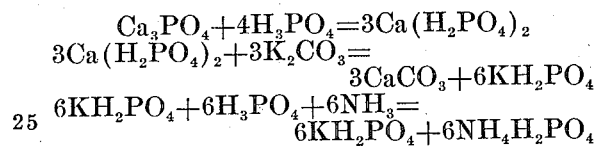

Having thus described our process, we claim:

1. A process for producing a concentrated fertilizer having the composition represented by $KH_2PO_4+NH_4H_2PO_4$ which consists in treating one equivalent of phosphate rock with ten equivalents of phosphoric acid to form three equivalents of calcium monophosphate with an excess of six equivalents of phosphoric acid; then adding ignited alunite in such a quantity that the sulfate present shall be equivalent to the calcium in the calcium mono-phosphate, filtering off the precipitated calcium sulfate, and adding gaseous ammonia to the filtrate until neutral to cochineal, when with proper concentration the whole mass on cooling becomes solid and consists of potassium and ammonium phosphate.

2. A process for producing a concentrated fertilizer having the composition represented by $KH_2PO_4+NH_4H_2PO_4$ which consists in heating one equivalent of phosphate rock with ten equivalents of phosphoric acid to form three equivalents of calcium monophosphate with an excess of six equivalents of phosphoric acid; adding potassium sulfate equivalent to the calcium in the calcium mono-phosphate; filtering off the precipitated calcium sulfate; and adding gaseous ammonia to the filtrate until neutral to cochineal, when with proper concentration the whole mass on cooling becomes solid and consists of potassium and ammonium phosphate.

3. A process for producing a concentrated fertilizer having the composition represented by $KH_2PO_4+NH_4H_2PO_4$ which consists in treating one equivalent of phosphate rock with four equivalents of phosphoric acid to form three equivalents of calcium monophosphate, adding a potassium compound having an acid radical which forms an insoluble compound with calcium, said potassium compound being added in quantity equivalent to the calcium in the calcium mono-phosphate, filtering off the precipitated calcium carbonate, and adding first six equivalents of phosphoric acid and then gaseous ammonia to the solution until neutral to cochineal when, with proper concentration, the whole mass on cooling becomes solid and consists of potassium and ammonium phosphate.

4. A process for producing a concentrated fertilizer having the composition represented by $xKH_2PO_4+yNH_4H_2PO_4$ which consists in treating phosphate rock with a quantity of phosphoric acid in excess of that necessary to form calcium mono-phosphate; adding potassium sulfate in amount equivalent to the calcium in the calcium mono-phosphate, adding gaseous ammonia to the filtrate until neutral to cochineal when, with proper concentration, the whole mass on cooling becomes solid and consists of potassium and ammonium sulfate.

In testimony whereof, we affix our signatures in the presence of two subscribing witnesses.

WILLIAM H. ROSS.
ALBERT R. MERZ.

Witnesses:
J. N. CAROTHERS,
W. J. O'BRIEN.